Patented May 1, 1923.

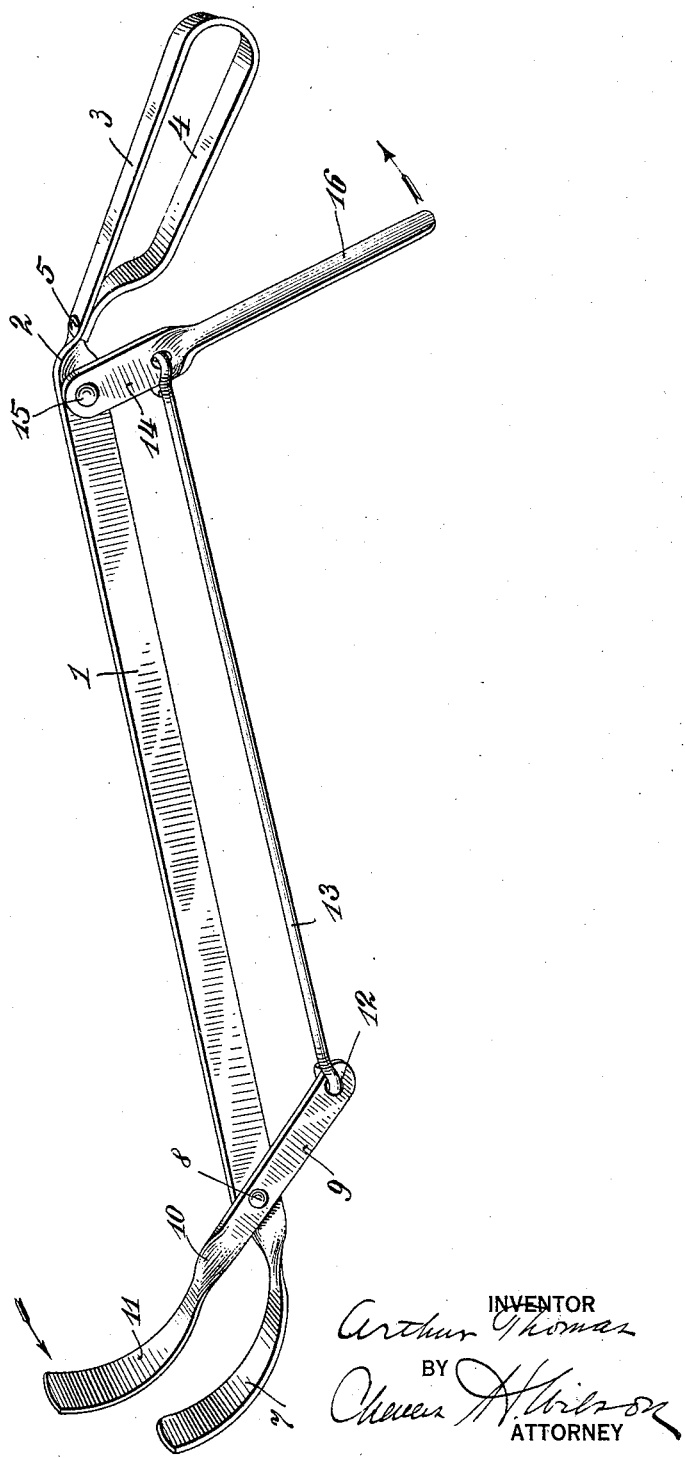

1,453,812

UNITED STATES PATENT OFFICE.

ARTHUR THOMAS, OF BAILEY, MICHIGAN, ASSIGNOR TO TRIUMPH TRAP CO., INC., OF ONEIDA, NEW YORK, A CORPORATION OF NEW YORK.

TRAP PLACER.

Application filed May 17, 1919. Serial No. 297,894.

*To all whom it may concern:*

Be it known that I, ARTHUR THOMAS, residing at Bailey, in the county of Muskegon and State of Michigan, have invented certain new and useful Improvements in a Trap Placer, of which the following is a specification.

This invention relates to a trap placer, that is to say, a device by means of which the user can grasp an animal trap and set it in the exact location, and then withdraw the instrument when the trap has been placed in a satisfactory position.

Another object of the invention is to provide a device of the above character, which can be used to place a trap under water, thus eliminating the necessity of the user placing his hands in the water; said instrument being also adapted to excavate or adjust the ground to receive the trap when the same is set on dry land.

The invention accordingly consists in the features of construction and arrangements of parts, which will be exemplified in the embodiment hereinafter set forth and defined as to scope and application by the prior art after the manner indicated in the following claim.

In the accompanying drawing the figure is a prospective view indicative of a preferred form of device constructed in accordance with my invention.

Before proceeding to a detailed description of the invention, it may be observed that heretofore in pursuing the occupation of trapping, it had been necessary for the trapper not only to handle the traps, which is objectionable, owing to the keeness of animals to detect the human scent, but because of the fact that traps are sometimes set beneath the surface of the water, it is necessary for the trapper to expose his hands to the cold water, making the work a very disagreeable feature of the trapping occupation.

By my invention the objectionable features hereinbefore mentioned are eliminated, and a device provided which possesses all and other advantages, some of which will be obvious during the course of the following description.

Referring now to the drawing, the reference numeral 1 indicates a bar, preferably formed of steel, the offset at its upper end at 2, to provide the handle 3, the handle being composed by a return portion of the bar 4, which is fastened to the bar proper at 5, as by means of a rivet. The bar 1, is will be noted, is turned at an angle of 45° at the part 2, so that the handle portion lies in a plane parallel with the plane of the bar.

The lower end of the bar 1 is turned at the point 6 to an angle of 45°, and extending therefrom is a curved jaw 7, the face of which, it will be noted, lies at right angles to the face of the bar 1.

Pivoted at 8 to the lower end of the bar 1 is a lever 9, which is bent at 10 to an angle of 45°, so that the curved jaw 11 formed by the outer end of the lever lies in a plane about concentric to that of the jaw 7. The inner end of lever 9 is connected at 12 by means of the rod 13, with a lever 14, pivoted at 15 near the upper end of the bar 1.

Lever 14 is provided with the handle 16, the lever being so shaped that the handle 16 lies directly beneath the handle 3.

In using the above described devices, it will be seen that the handle 3 can be grasped by the hand and the lever 16 manipulated by the fingers to cause the jaws 7 and 11 to grasp any desired portion of the trap, whereby the trap may be moved to or placed in any desired position, whereupon the jaws may be released therefrom.

When the jaws are closed, the device presents an instrument whereby the curved lower portion may be used as a scoop or shovel to remove dirt when it is desired to set a trap in the ground, so that it can be conveniently covered by twigs, leaves, etc., whereby the trap may be set in a semi-concealed position. The handle itself may be also used as a butt with which to kill the trapped animal.

It will accordingly be seen that I have provided a device well adapted to attain, among others, all the ends and objects above pointed out, in a simple yet efficient manner. The device itself is simple in construction, easy to operate, and may be conveniently carried by the trapper.

By means of the offset handle, and the shape and disposition of the jaws, it will be noted that when the handle is grasped by the trapper, the jaws will be in a position to grasp a horizontal portion of the trap.

As many changes could be made in this construction without departing from the scope of the following claim, it is intended that all matter contained in the above description or shown in the accompanying drawing shall be interpreted as illustrative only and not in a limiting sense.

Having thus described my invention what I claim as new and desire to secure by Letters Patent is:—

A trap placer comprising a digging implement having a body composed of a main flat bar of metal provided at one end with a handle, the said main bar having a portion near its other end twisted upon itself at right angles and the end portion of the bar beyond the said twist being curved to form a flat curved jaw, a second and relatively shorter bar of flat metal constituting a jaw lever pivotally attached to the said main bar near the twisted portion thereof, the end portion of the said second bar being twisted upon itself at right angles to form a flat curved jaw corresponding to the said curved jaw of the main bar whereby the said jaws may be closed together to reenforce each other for digging, a hand lever pivotally attached to the said main bar near the said handle, and a rod pivotally connecting the said hand lever and the pivoted jaw lever.

In testimony whereof I affix my signature in the presence of two witnesses.

ARTHUR THOMAS.

Witnesses:
LILLIAN R. KLASSEN,
EDWARD HANSON.